United States Patent [19]

Mitchell et al.

[11] 4,427,042
[45] Jan. 24, 1984

[54] POWER TOOL

[75] Inventors: Richard L. Mitchell; Richard B. Brundage; John A. Palmer, all of St. Louis County, Mo.

[73] Assignee: Emerson Electric Co., St. Louis, Mo.

[21] Appl. No.: 263,122

[22] Filed: May 13, 1981

[51] Int. Cl.³ .......................... B27C 1/14; B27C 9/04
[52] U.S. Cl. .................................. 144/1 R; 144/2 R; 144/117 R; 144/286 R; 200/42 T; 200/334; 408/710
[58] Field of Search ............... 144/117 R, 285, 286 R, 144/2 R, 1 R, 3 R; 200/42 T, 334; 408/710

[56] References Cited
U.S. PATENT DOCUMENTS

| | | | |
|---|---|---|---|
| 2,674,130 | 4/1954 | Spychalla | 144/1 R |
| 2,784,752 | 3/1957 | Emrick | 144/1 R |
| 3,352,334 | 11/1967 | Hunn | 144/1 R |
| 3,632,914 | 5/1981 | Mitchell | 200/42 T |

Primary Examiner—W. D. Bray
Attorney, Agent, or Firm—Polster, Polster and Lucchesi

[57] ABSTRACT

A dual power tool, such as a jointer/planer, is disclosed in which the cutting head of the tool is mounted on a common shaft which also serves as the rotor shaft for the tool drive motor. This dual power tool is mounted on a single stand and has a switch enabling only one tool at a time to be operated. A retrofit kit is disclosed for permitting a tool owner to convert a single power tool into a dual power tool.

17 Claims, 11 Drawing Figures

POWER TOOL

BACKGROUND OF THE INVENTION

This invention relates to a power tool, and more particularly to a direct drive power tool, such as a jointer/planer or other rotary tool, in which the cutting head of the tool is mounted on a common shaft which also serves as the rotor shaft for the tool drive motor. Further, this invention relates to a dual power tool mounted on a single stand having a switch enabling only one tool at a time to be operated. Still further, this invention relates to a retrofit kit for permitting a tool owner to convert a single power tool into a dual power tool.

Heretofore, woodworking or wood cutting machines, such as jointer/planers or the like, were typically indirectly driven by means of an electric motor offset from the tool and interconnected to the cutting head by means of a V-belt and pulley drive or the like. These indirectly driven power tools required a considerable volume and were not compact. Additionally, they required extensive safety guards or shields so as to protect the user against injury which may be caused by the moving belts and pulleys. Still further, environments in which woodworking tools as used typically have large quantities of airborne dirt and debris (e.g., saw dust and chips). Moreover, since the electric motor driving the power tool is oftentimes mounted below the cutting tool of the power tool, the debris falls down onto the motor and, due to the ventilating system within the motor, is drawn into the motor causing problems with the motor bearings and also with other rotating parts within the motor. In the interest of cost savings, the electric motors power in many power tools, particularly for home workshop use, are open, ventilated motors and thus are even more susceptible to airborne dirt.

In many home woodworking shops floor space is limited. Heretofore, large power tools, such as table saws and jointer/planers, were supported on separate, stand-alone support stands. Because of the size requirements of these larger tools, particularly with indirect drive motors, and also because of the necessity of having sufficient work space around each of the tools, the home workshop hobbist required considerable additional floor space in his workshop before he could add an additional power tool. Furthermore, since certain power tools, such as a jointer/planer, are not constantly used, and because their purchase price is relatively high, many home workshop owners had difficulty in justifying the cost of such a tool, even though the new tool would greatly enhance their woodworking capabilities.

As will be pointed out hereinafter, this invention includes the provision of mounting two power tools, such as a table saw and a jointer/planer, on a common stand thereby to minimize the cost and work space of the two power tools. However, when two such tools are mounted on a common stand it is an important safety consideration that one of the tools be positively disabled (i.e., inoperable) while work is being performed on the other tool.

SUMMARY OF THE INVENTION

Among the several objects and features of the present invention may be noted the provision of a rotary power tool, such as a jointer/planer or the like, having a rotary tool directly driven by its driving motor without any interconnecting drive mechanism, such as a belt and pulley drive or gear box, and without the necessity of complex safety guards;

The provision of such a direct drive tool in which the wood chips and saw dust generated by the tool are directed away from the driving motor;

The provision of such a direct drive tool in which the bearings mounting the rotary cutting tool serve the double function of rotatably mounting the tool and also rotatably mounting the rotor assembly within the bore of the stator of the drive motor;

The provision of such a direct drive tool which is of compact size and of rugged construction;

The provision of such a direct drive tool in which the stator assembly of the direct drive motor may be removed from the tool for repair without the necessity of removing the bearings journal supporting the tool and the motor rotor assembly;

The provision of such a direct drive power tool, such as a jointer/planer, which may be mounted in combination with another tool, such as a table saw, on a common stand so as to conserve floor space within the workshop;

The provision of a power tool in which two independently operable power tools are mounted on a single support stand and in which one of the power tools may be selectively operated with the other power tool being positively disabled;

The provision of such a dual power tool assembly in which both of the power tools may be positively disabled thereby to prevent unauthorized or unintentional operation of either of the power tools; and The provision of a retrofit kit for an already existing power tool, such as a table saw mounted on a stand, in which the already existing stand may be readily modified so that both the existing power tool and an additional power tool may be mounted on a modified stand thereby to conserve floor space and to minimize the cost to the workshop owner of owning both power tools.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
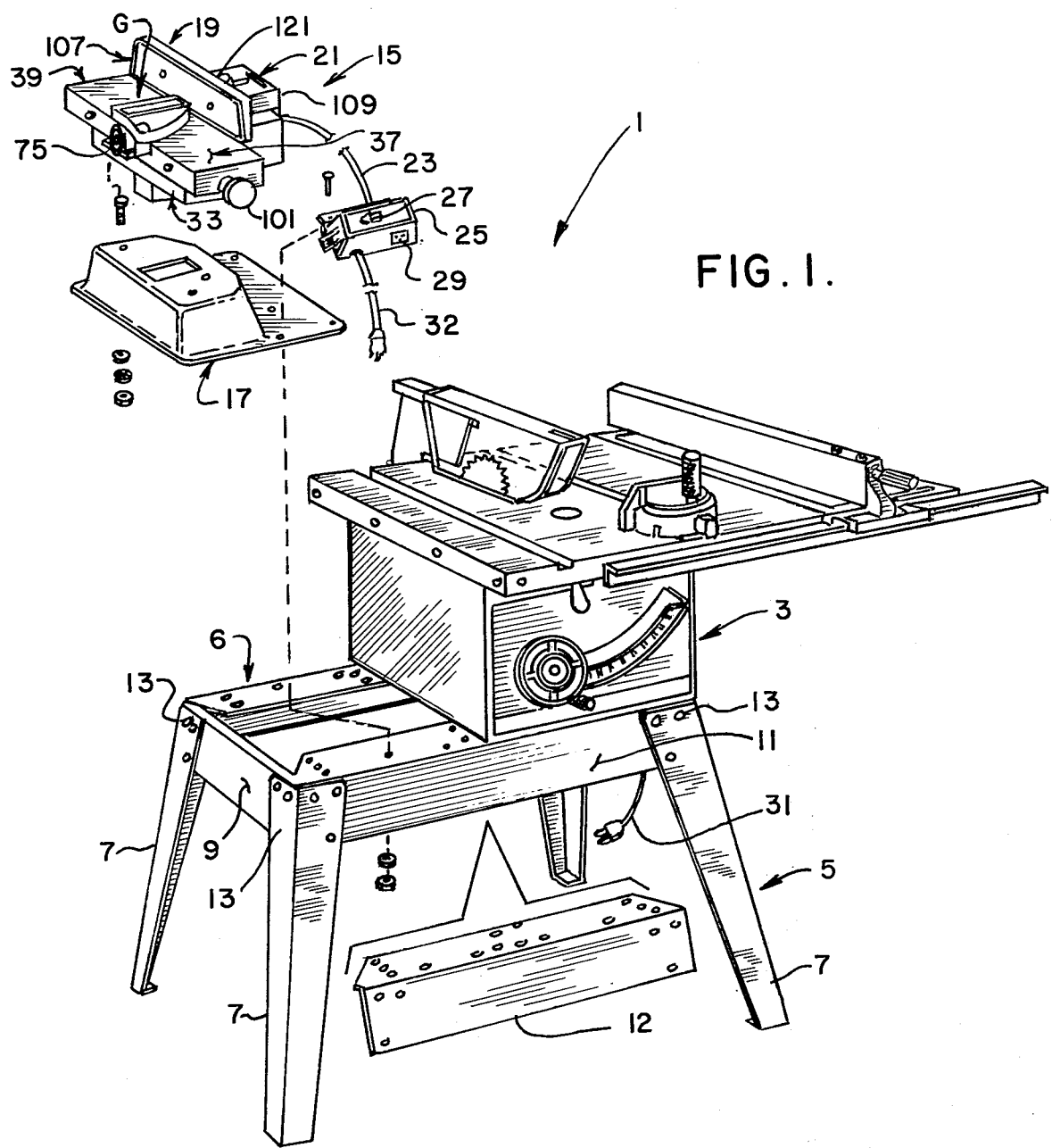
FIG. 1 is an exploded perspective view of a combination power tool of the present invention having a first power tool (e.g., a table saw) mounted on a retrofit work stand and a second power tool (e.g., a jointer/planer) also mounted on the common work support stand and illustrating a kit for converting a single power tool and work stand (e.g., a table saw with its original work support stand) to the dual tool combination power tool and common work base.

Referring now to the drawings, and particularly to FIG. 1, a dual power tool, combination leg set assembly of the present invention is generally indicated by reference character 1. This combination dual power tool leg set assembly is shown to comprise a first power tool, such as a table saw, generally indicated at 3. The table saw is shown to be securely mounted on a retrofit support stand of the present invention, indicated in its entirety at 5. The support stand includes an upper base frame 6 supported by a plurality (e.g., four) of legs 7. The base frame comprises a pair of opposite end frame members 9 secured to elongate side members 11 so that the base frame 6 is generally an elongate rectangular form of sufficient length to support not only the first power tool, but also a second power tool in the manner as will be hereinafter described. Side members 11 replace shorter side members 12, shown in brackets in FIG. 1, which were originally incorporated in the base frame for the support stand for an already existing table saw 3 and support stand 5. It will be understood that by replacing the shorter side members 12 with the longer side members 11, the support stand for the single power tool may be retro-fitted to accommodate both the first power tool and an additional power tool. Of course, legs 7 are securely bolted to base frame 6 and the end and side members of the base frame are securely fastened together by means of bolts 13.

As mentioned above, a second power tool, as generally indicated at 15, is intended to be retro-fitted on the modified support stand 5. This second power tool includes a formed sheet-metal base 17 adapted to be bolted to the upper surface of base frame 6 and a direct drive jointer/planer 19 mounted on sheet-metal support 17 thereby to constitute the second power tool 15 on the combination dual power tool assembly 1.

Figure 5:
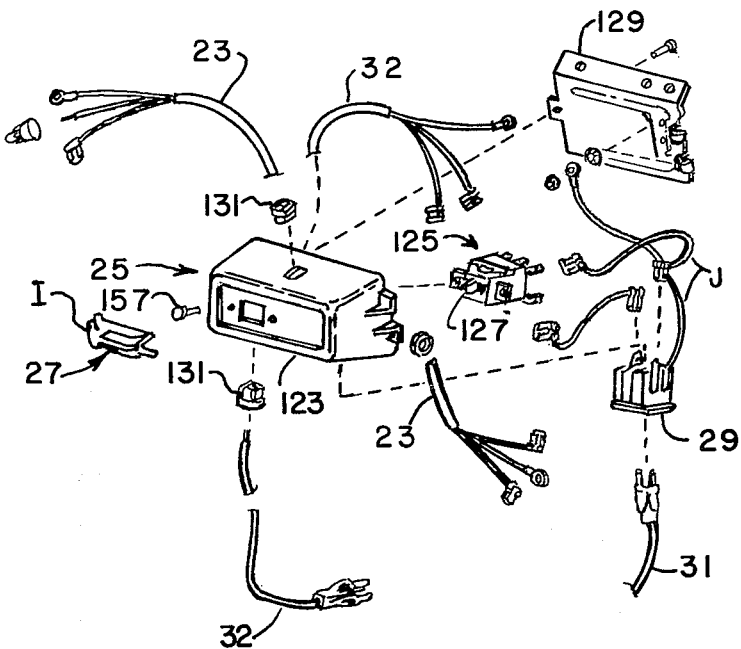
FIG. 5 is an exploded view of the components making up a switch assembly for selective energization of one of the power tools shown in FIG. 1 and for simultaneous disablement of the other power tool and for selective disablement of both power tools.
Figure 7:
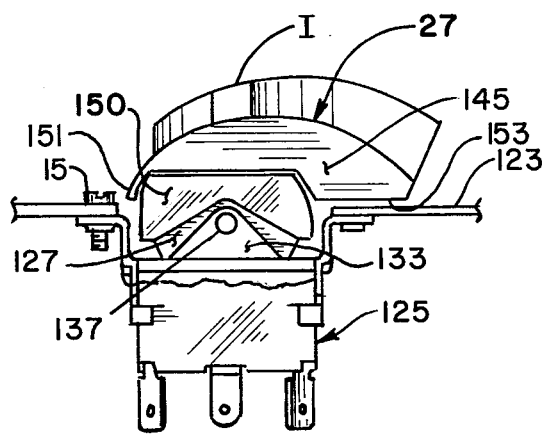
FIG. 7 is a side elevational view of a tool selector-on/off switch shown in FIG. 5 including a key having indicia thereon (an arrow) with the key inserted in the switch in a first position so as to permit energization of a first power tool (e.g., the jointer/planer shown in FIG. 1) toward which the indicia on the key points and for disabling and positively preventing energization of the other power tool.

In accordance with this invention, jointer/planer 19 is a direct drive unit having an electric induction motor 21 integral with the tool thereby eliminating the necessity of indirect drive assemblies, such as V-belt and pulley drives or gear boxes and the necessary safety enclosures therefore. A power cord 23 supplies electrical power to motor 21 and is connected to a tool selector-on/off switch assembly, as generally indicated at 25, mounted on base frame 6 at a convenient location for ready operation when an operator is either operating the table saw 3 or the jointer/planer 19. The selector switch 25 includes the provision of a removable key 27 which, when in a first installed position (as shown in FIGS. 1, 5 and 7), permits energization of one of the power tools (e.g., the jointer/planer) while disabling or de-energizing operation of the other power tool. When key 27 is removed from the switch and installed in a second position, the first power tool (e.g., the jointer/planer) is disabled and the second tool (e.g., the table saw) may be selectively energized. The switch assembly further includes a receptacle 29 into which the power cord 31 for the table saw 3 may be plugged. Additionally, the switch assembly 25 includes a single power cord 32 which may be plugged directly into a wall outlet or the like. In this manner, it will be understood that none of the power tools 3 or 19 is plugged directly into a wall outlet, but rather only the switch assembly power cord 32 is plugged into the wall outlet. In this manner, the switch assembly 25 may readily control operation and disablement of either of the power tools in a manner as will be more fully explained hereinafter. The construction and operation of selector switch 25 will be more fully explained.

Figure 3:
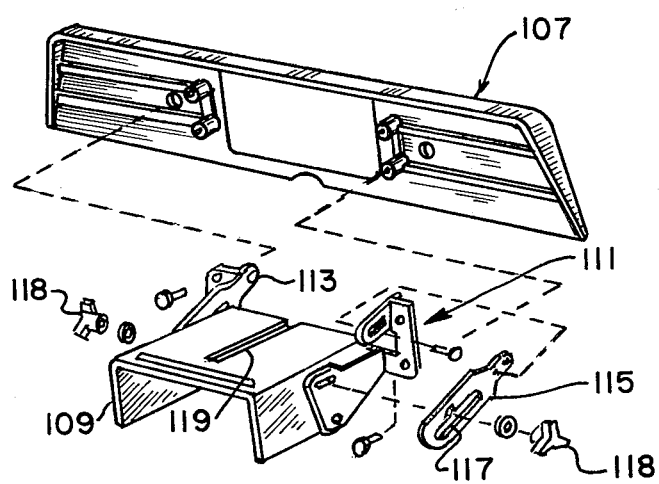
FIG. 3 is an exploded perspective view taken along lines 3—3 of FIG. 2 illustrating the details of the fence guide for the power tool illustrated in FIG. 2.
Figure 2:
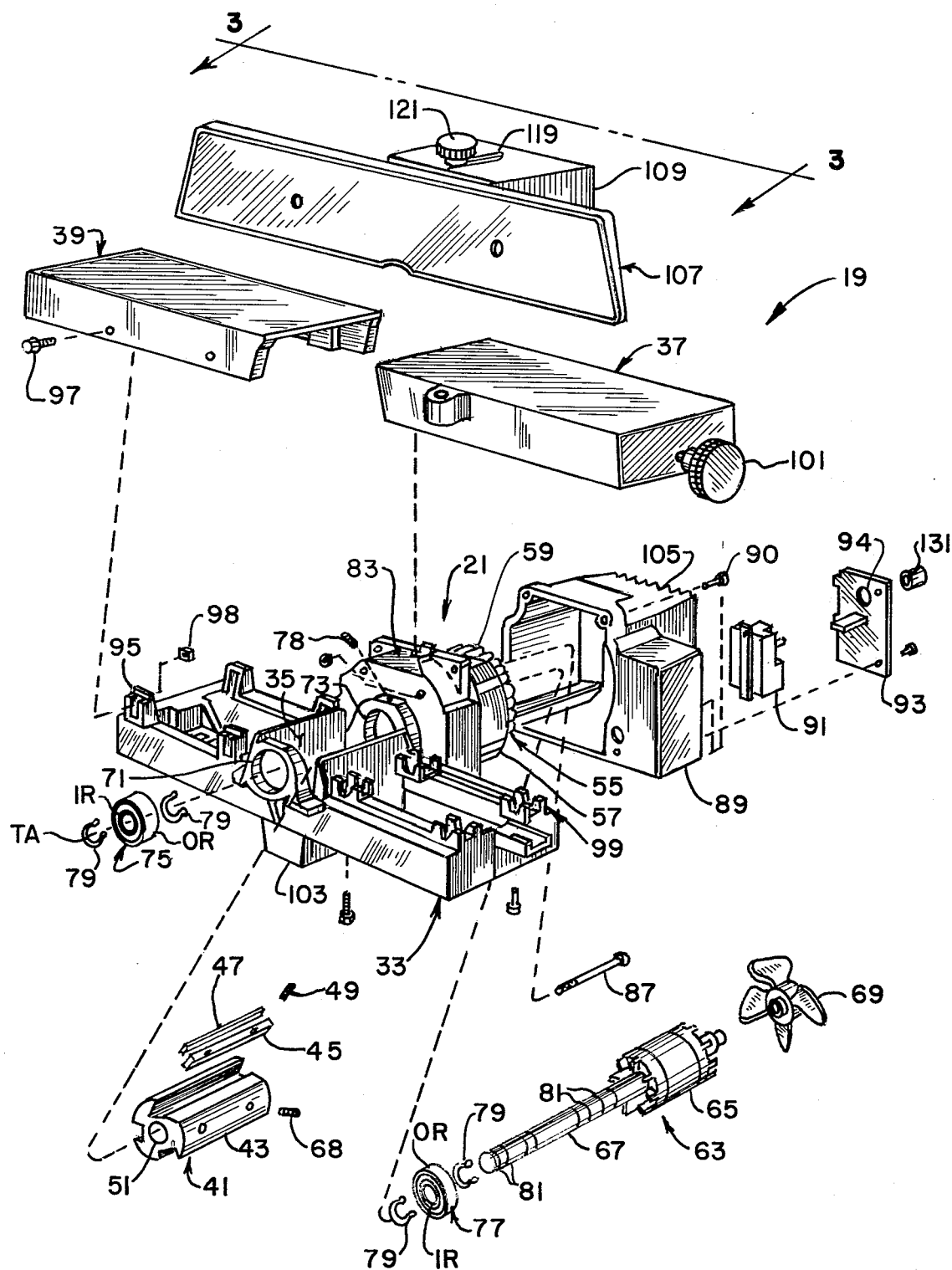
FIG. 2 is an exploded perspective drawing of a power tool of this invention, such as a jointer/planer, having a direct drive motor.
Figure 4:
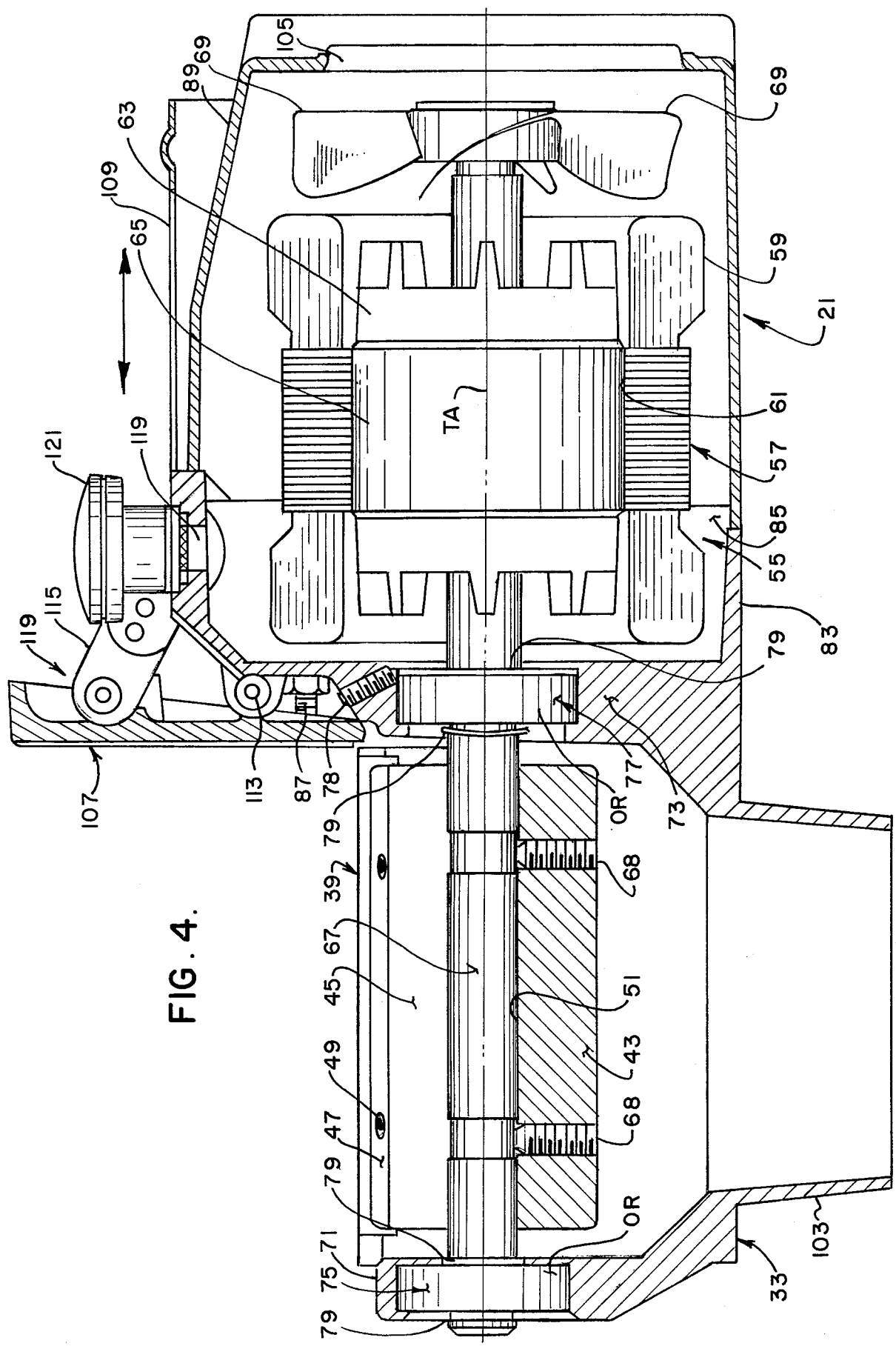
FIG. 4 is a longitudinal vertical cross-sectional view taken along the central rotatable axis of the direct drive power tool illustrated in FIG. 2.

Referring now more specifically to FIGS. 2–4, the construction and operation of the direct drive jointer/planer 19 of the present invention will now be disclosed in greater detail. In FIG. 2, jointer/planer 19 is shown to comprise a unitary base casting 33 which has a rotary tool receiving opening 35 therewithin. An infeed table 37 is adjustably mounted on the base casting on the right-hand side of tool receiving opening 35 (as viewed in FIG. 2) and an outfeed table 39 is adjustably mounted on the other side of the tool receiving opening. The inner ends of the infeed and outfeed tables are spaced apart above the tool receiving opening whereby the cutter blades (as will be hereinafter disclosed) may cuttingly engage a workpiece (not shown) moved across the upper surfaces of the tables.

A rotary cutting head, as generally indicated at 41, is rotatably mounted within tool receiving opening 35 for rotation in clockwise direction (as shown in FIG. 2) about a central longitudinal tool axis within base casting 33, as generally indicated at TA in FIGS. 2 and 4. Cutting head 41 is shown to comprise a generally cylindric cutter body 43 provided with three cutting blade assemblies spaced generally at equal angular intervals around the cutter body. Each of the cutter assemblies includes a cutter blade wedge 45, a cutter blade 47, and a plurality of set screws 49 which draw the cutter blade wedge into clamping engagement with the cutter blade thereby to forcibly hold the cutter blade on cutter body 43. The cutter body has a longitudinal bore 51 extending therethrough.

In accordance with this invention, the direct drive power tool 19 of the present invention is provided with a direct drive electric induction motor 21 fixedly mounted to the base casting 33 and directly driving the rotatable cutter head 41. Motor 21 includes a stator assembly 55 including a core 57 made of a stack of sheet-like laminations of suitable ferro-magnetic material with each of the laminations being prepunched to have a central opening therethrough and having a plurality of blind notches extending generally radially outwardly from the central opening. When the laminations are assembled together into a stack to form core 57, the radial slots form elongate slot-like openings extending through the cores in which the winding coils 59 of the stator assembly may be inserted and the central opening of each of the laminations forms a bore 61 extending longitudinally through the core.

Further, direct drive motor 21 includes a rotor assembly, as generally indicated at 63, including a rotor body 65 fixedly mounted on a rotor shaft 67. The rotor shaft extends axially outwardly from one end of the rotor body and thus constitutes an arbor shaft on which rotary cutting head 41 is fixedly mounted. The central axis of rotor shaft 67 is coaxial with axis TA. More particularly, the outward extension of rotor shaft 67 is adapted to be received in central bore 51 of the cutter body 43. The latter is fixedly held-in-place on the rotor shaft by means of set screws 68 whereby the cutter head is directly driven by and rotates at the same speed as rotor assembly 63. An air moving fan 69 is affixed to the opposite end of rotor shaft 67 to draw air through the motor in a manner as will appear for ventilation and cooling purposes.

Base casting 33 is provided with an integral outer bearing pillow 71 and with an integral inner bearing pillow 73 at opposite ends of the tool receiving opening 35 with the openings of the inner and outer bearing pillows being generally coaxial with tool axis TA. An outer rolling element or anti-friction bearing assembly 75 is mounted within outer bearing pillow 71 and an inner rolling element bearing assembly 77 is mounted within the inner bearing pillow 73. Each of these bearing assemblies includes an outer race OR having a press fit within their respective bearing pillows and an inner race IR. The inner race has a bore therethrough for reception of journal portions of rotor shaft 67. The inner bearing assembly 77 is fixedly held-in-place with respect to inner bearing pillow 73 by means of a set screw 78, as is best illustrated in FIG. 4. Rotor shaft 67 is positively held in a fixed axial relation with inner and outer bearings 75 and 77 by means of snap-rings 79 on either side of the respective bearing assemblies which are fitted into respective circumferential grooves 81 formed in rotor shaft 67 on either side of the journals on the rotor shaft.

In this manner, it will be understood that the rolling element bearings 75 and 77 perform the dual function of not only rotatably supporting cutter head 41, but also rotatably support rotor assembly 63 in cantilever fashion within bore 61 of the stator core of motor 21.

Base 33 further includes a motor mounting housing 83 integral with the base casting with the motor mounting housing having a stator receiving cup 85 (see FIG. 4) therewithin. This stator receiving cup is preferably machined so that its central axis is concentric with tool axis TA and so that it is sized to snugly and accurately receive the outer surface of stator core 57 thereby to accurately and positively mount the stator core in coaxial relationship with tool axis TA. In this manner, tool axis TA is coaxial with the respective longitudinal axes of the rotor assembly 63, the stator assembly 55, the inner and outer support bearings 71 and 73, and the rotary cutting head 41.

Stator core 57 is provided with a plurality of axial bolt holes (not shown) extending generally parallel to, but spaced radially outwardly from, bore 61 for receiving respective through-bolts 87 which pass through the stator core and which pass through respective openings formed in stator mounting housing 83 whereby the stator core may be securely bolted to the motor housing and the stator core may be axially drawn into firm positive engagement with the stator receiving cup 85. It will be appreciated that, in the event it becomes necessary to repair the stator assembly, it may be readily removed from housing 83 merely by removing through-bolts 83. It is not necessary to disassemble the bearing assemblies 75 or 77 to remove the stator.

A motor enclosure 89 is fitted around the cantilevered stator assembly 55 and is secured to motor housing 83 thereby to enclose the motor components and fan 69. As best shown in FIG. 2, a motor starting relay 91 is installed within an appropriate compartment of housing 89 and is enclosed by a cover plate 93. The power cord 23 supplying electrical power to motor 21 passes through an opening 94 in the cover plate for connection to motor starting relay 91 in a manner as will hereinafter described.

In FIG. 2, base casting 33 is shown to have a plurality of (e.g., four) mounting bosses 95 cooperable with outfeed table 39. A table securement bolt 97 is adapted to be inserted through holes in outfeed table 39 and through slots (not shown) in bosses 95 and to be cooperable with a respective nut 98 thereby to permit selective vertical adjustment of the outfeed table relative to the base casting and to securely lock the outfeed table in a desired heightwise position relative to the base casting. It will be understood that once the outfeed table is positioned in a desired horizontal position relative to the base casting, its angle and elevation will not normally be adjusted.

Base casting 33 is further provided with a plurality (e.g., four) of bosses 99 on the opposite side of cutting tool receiving opening 35 for adjustably mounting infeed table 37 such that it may be selectively, adjustably moved in vertical direction with respect to the base casting and with respect to the cutting tool 41 mounted within cutting opening 35 thereby to adjust the depth of cut to be made on a workpiece. This infeed table height adjustment means is controlled by an adjustment knob 101 via an inclined slot and pin arrangement with the infeed table being resiliently held in its adjusted position by means of a spring (not shown) in a manner well-known to those skilled in the jointer/planer art. Because the table adjustment means per se does not constitute a part of the instant invention, a detailed description of this adjustment means has, for the sake of brevity, been omitted.

As best shown in FIG. 4, tool receiving opening 35 is defined by a plurality of walls forming not only the cutting tool receiving opening, but also forming a downwardly directed chip discharge chute 103 for directing wood chips and saw dust downwardly whereby the chips may be readily collected.

Motor enclosure 89 is shown to have a plurality of open slots 105 at its rear end opposite the motor so that fan 69 mounted on rotor shaft 67 may draw cooling air into the motor enclosure and to blow it over the rotor assembly, through the air gap between the rotor body 65 and core 57, and to exhaust the air through other openings (not shown).

A work guide fence assembly, as generally indicated at 107, is provided adjacent motor housing 83 for serving as a guide for the work to be cut by the rotary cutter 41 as the work is moved across the infeed and outfeed tables 37 and 39. This fence assembly includes a shroud 109 that is mounted to base casting 33 at the stator enclosure 83 and extends rearwardly out over at least a portion of motor housing 89. This shroud may be formed of stamped sheet-metal and is generally U-shaped when viewed in cross section so as to overlie the top and sides of the motor housing. As generally indicated at 111 in FIG. 3, means is provided for adjustably mounting fence 107 on housing shroud 109 for adjustably positioning and locking the fence in either a perpendicular position (as shown in FIG. 4) or at a desired angled position whereby work guided along the fence may have a bevel cut formed thereon. This adjustment means includes a horizontal pivot connection 113 about which fence 107, this horizontal pivot axis extending generally perpendicular to and above the tool axis TA. The adjustment means further comprises an upper adjustable link assembly 115 which permits the fence to be rotated about the pivot connections 113 through an angle generally as indicated by the arrows in FIG. 4. A slot 117 is provided in link assembly 115 and a threaded clamping knob 118 is provided in the slot so that upon tightening the clamping knob, the fence may be securely held in any desired angled position relative to pivot points 113. Further, a central longitudinal slot 119 is provided in the top of shroud 109 and a threaded stud 120 is fixed to and extends upwardly from motor housing support 83 for reception in slot 119. A clamping securement knob 121 (see FIG. 4) is threaded onto stud 119 which when tightened securely fixes the shroud 109 and thus the entire fence assembly and rotatable adjustment means 111 relative to base casting 33. It will be appreciated that with locking knob 121 loosened, shroud 109 together with the fence assembly 107 may be moved longitudinally in a direction parallel toward the tool axis TA.

Figure 6:
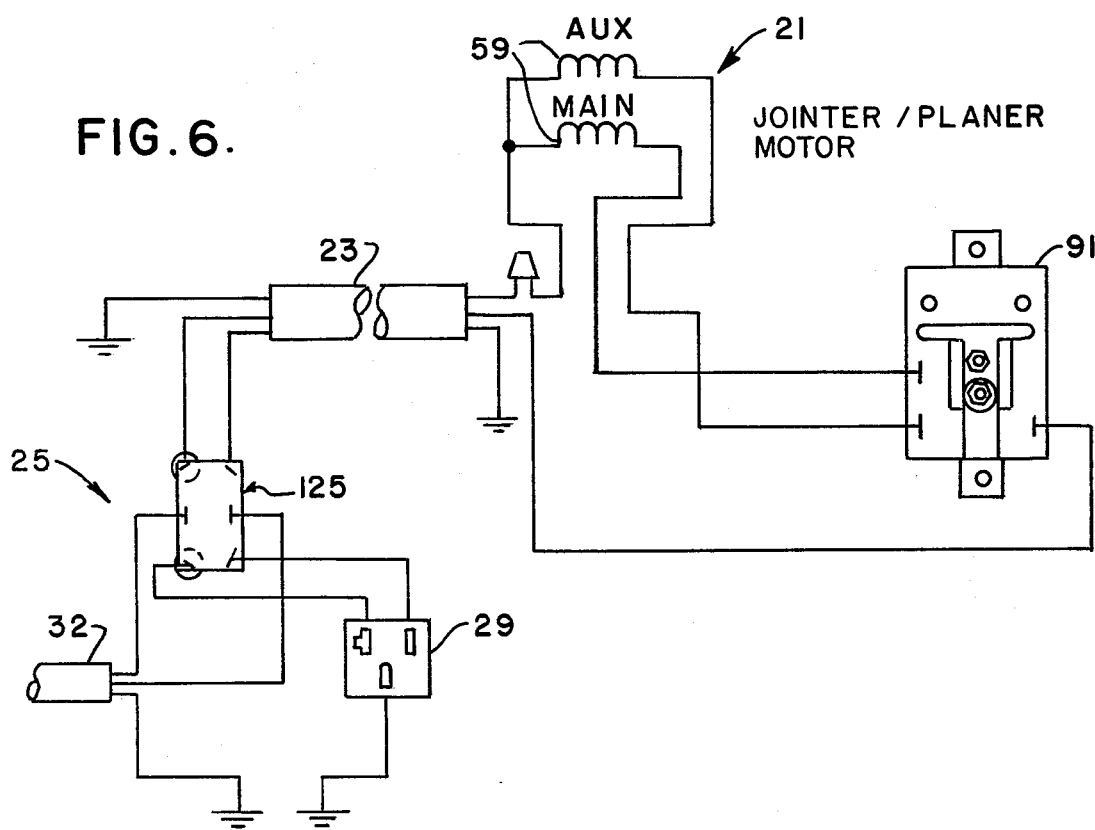
FIG. 6 is a schematic wiring diagram of the switch assembly and second tool (e.g., the jointer/planer) as shown in FIGS. 1 and 5.

Referring now to FIGS. 5 and 6, the tool selector, on/off switch assembly 25 will now be described in greater detail. This switch assembly includes a switch box 123 adapted to be mounted on base frame 6 at a convenient working position generally between the first and second power tools (e.g., between table saw 3 and jointer/planer 19) so as to be readily accessible to the operator of either of the power tools. The switch assembly includes a 3-position rocker switch, as generally indicated at 125, mounted within switch box 123 and having a switch actuator member 127 extending therefrom and rockably movable from a central off position to a first position on one side of the central off position and to a second operable position on the other side of the central off position. Switch box 123 is mounted to the base frame 6 by means of a switch housing mounting plate 129. Receptacle 29 is mounted in an opening (not shown in FIG. 5) provided in the bottom wall of switch box 123 and power cords 23, 31, and 32 are interconnected to rocker switch 125 and to receptacle 29 in the manner clearly indicated in the wiring diagram shown in FIG. 6. Further, FIG. 6 illustrates the manner in which power cord 23 is connected to the windings 59 of the jointer/planer motor 21 via motor relay 91. Power cords 23 and 32 extend through the walls of switch box 125 and are supported by respective strain relief grommets 131. The rocker switch and the receptacle 29 are provided with a plurality of male terminals to which a plurality of jumper wires J may be readily connected in the manner shown in FIG. 6. It is believed that FIG. 6 is sufficiently clear to permit those skilled in the art to fully and adequately understand the manner in which the dedicated, independent drive motors of table saw 3 and jointer/planer 19 are energized.

Referring now to FIGS. 7-11, switch 125 is shown installed in switch housing 123 and its operation will be now disclosed in detail. Specifically, switch 125 is a key operated lock-type switch commercially available from the McGill Manufacturing Company of Valparaiso, Indiana and is similar to a switch shown in U.S. Pat. No. 3,632,914 assigned to McGill Manufacturing Company. However, the switch disclosed in the above-indicated patent is a single-pole, single throw switch while the switch utilized in applicant's present invention is a modification of that switch so that it is a single-pole, double throw switch thereby to enable it to energize and de-energize both of the motors power tools 3 and 19.

Figure 10:
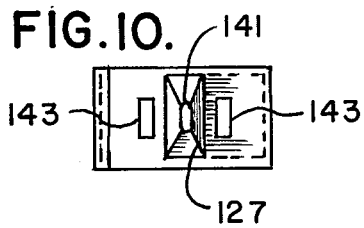
FIG. 10 is a top plan view of an actuator member for the switch which receives the key.
Figure 11:
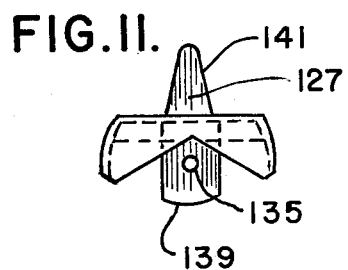
FIG. 11 is a side elevational view of the actuator member shown in FIG. 10.

As shown in FIG. 7, switch 125 includes a pair of spaced trunnions 133 extending up from the switch body. In FIGS. 10 and 11, switch actuator member 127 is shown to have an aperture 135 extending therethrough and it will be understood that the switch actuator member is received between the trunnion members 133 in such manner that a pin 137 may be inserted through apertures in the upper portion of the trunnion members and received by aperture 135 in the switch actuator member. In this manner, the actuator member 127 is rockably supported within the switch and is operable in the manner generally disclosed in the above noted U.S. Pat. No. 3,632,914. Further actuator member has a plunger 139 which extends down into the body of switch 125 and operates switch contact members similar to that described in the above noted patent. Still further, actuator member 127 has a protrusion 141 that extends upwardly therefrom for cooperation with key 27. The body of the actuator member further includes a pair of openings 143, one on each side of protrusion 141, for purposes as will appear.

Figure 8:
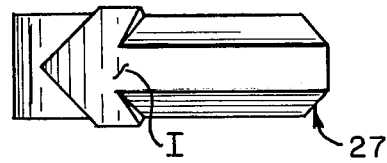
FIG. 8 is a top plan view of the switch key shown in FIG. 7.
Figure 9:
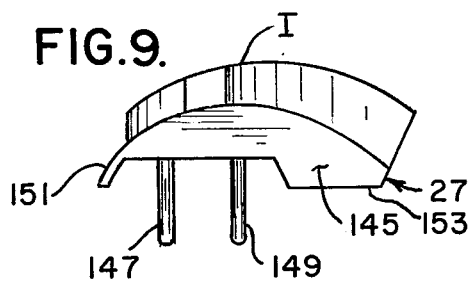
FIG. 9 is a side elevational view of the switch key.

As shown in FIGS. 8 and 9, key 27 is preferably a one-piece part or body 145 molded of a suitable synthetic resin material, and as is clearly shown in FIG. 8, indicia I is a large arrow. The key further includes a pair of lugs 147 and 149 (see FIG. 9) which are spaced apart from one another and which are adapted to be received in openings 143 in actuator member 127. It will be understood that protrusion 141 of the actuator member fits snugly between lugs 147 and 149. It will be understood that the dimensions of lugs 147, 149 and the dimensions of protrusion 141 and openings 143 are such that the lugs of the key will have a firm snug, fit when plugged into the apertures 143 thereby to hold the key in place and to prevent inadvertent removal of the key during operation of the power tool. However, the key may be readily axially removed from the openings 143 when desired. As explained above, the key may be installed in the switch in either a first position, as illustrated in FIG. 7, in which the tip of the indicia arrow points toward the left, or it may be removed and rotated 180°, and reinserted in openings 143 of actuator member 127 so that the tip of the arrow points toward the right.

Switch 125 further includes a rocker cover member 150 which overlays and protects actuator member 127 and which has an open top for permitting protrusion 141 to extend therefrom and for permitting lugs 147 and 149 to be inserted therethrough for reception in openings 143.

As best shown in FIGS. 7 and 9, key 27, body 145 includes a nose 151 at the end thereof adjacent the tip of the indicia arrow I and a tail 153 at the opposite end thereof. As shown in FIG. 7, with the switch installed in switch housing 123, a gap is present between the edges of the opening in the walls of the switch housing and the outer surface of rocker member 155 of such dimension so as to permit nose 151 of key member 27 to readily fit between the edge of the housing defining the opening as the switch member is rotated or rocked from its off position (as shown in FIG. 7) toward the direction of the tip of the indicia arrow (i.e., counter clockwise as shown in FIG. 7) thereby to permit energization of a selected tool. It will be understood that to turn off the switch, the operator need merely apply an axial force to the outer surface of the key member and the switch actuator member will rotate from its energized position to its central de-energized position thereby de-energizing and disabling both of the power tools. Because of the construction of key 27 and because of the overlying relationship of tail 153 with the wall of the switch housing, it will be understood that the switch actuator member 127 is positively prevented from rotating in clockwise direction (as shown in FIG. 7) from its off position to its second operating position thereby positively preventing operation of the second power tool. However, when the key is removed from the switch, is rotated 180°, and is again inserted in the switch, then the switch may be readily rotated from its central off position to its second operating position thereby to permit operation of the second power tool while positively disabling and preventing operation of the first power tool. It will be further appreciated that with the key removed and with actuator member in its centered off position, rocker member 155 is free to rotate relative to actuator member 127 without causing rotary movement of actuator member 127 and thus with the key removed, rocking movement of rocker 155 has no effect on the switch and neither power tool can be operated. However, if the key 27 is removed when the actuator is in either its first or second operative position, rocking movement of rocker 155 will return the actuator member 127 to its central off position thereby de-energizing both of the tool motors. Lugs 147 and 149, when received in openings 143 interconnect the key to the actuating member and permit rockable movement of the actuator member relative to the switch upon rockably moving the key. Of course, when key 27 is removed from the switch, unauthorized operation of either of the power tools is prevented. Thus, in a home workshop environment, the switch key can be removed thereby preventing small children, for example, from inadvertently operating the power tool.

As shown in FIG. 1, jointer/planer 19 is provided with a swingable guard G overlying cutter assembly 41 for protecting and guarding the cutter assembly except while a workpiece is being fed across the cutter.

In view of the above, it will be seen that the several objects and features of this invention are achieved and other advantageous results obtained.

As various changes could be made in the above constructions with departing from the scope of the invention, it is intended that all matter contained in the above description or shown in the accompanying drawings shall be interpreted as illustrative and not in a limiting sense

What is claimed is:

1. A direct drive rotary tool, such as a jointer/planer or the like, comprising a unitary base, said base having a central axis extending generally transversely of the base, a rotary cutter rotatable about said central axis and being cuttingly engageable with a workpiece, and a direct drive motor for rotatably driving said cutter, said motor comprising a rotor assembly including a rotor body and rotor shaft extending endwise from the rotor body, said rotor shaft being coaxial with said central axis and being journaled by a pair of bearings carried by said base on opposite sides of said cutter, said rotor body being cantilevered by said bearings, said motor further comprising a stator including a core having a bore therethrough, said bore receiving said rotor body for rotation of the latter within said bore, said base further having means for mounting said core on said base with said bore being substantially coaxial with said central axis.

2. A direct drive tool as set forth in claim 1 wherein said base includes a pair of bearing pillows, one on each side of said cutter, for receiving a respective bearing, said pillows being generally coaxial with said central axis and said bearings journaling said rotor shaft.

3. A direct drive tool as set forth in claim 1 wherein said base further includes a stator mount integral therewith, said stator mount having an inner surface concentric with said central axis so that with said stator received in said stator mount and with said rotor shaft received in said bearings, said rotor body is substantially centered within said bore.

4. A direct drive tool as set forth in claim 3 wherein said stator core has a plurality of holes extending axially therethrough and wherein said tool further comprises a plurality of fasteners, one for each of said stator holes, for securely mounting said stator within said stator mount.

5. A direct drive tool as set forth in claim 3 further comprising an enclosure for said stator and rotor assembly installed on said stator mount.

6. A direct drive power tool as set forth in claim 5 further having table means along which said workpiece may be moved for cutting engagement with said cutter, a fence assembly extending generally perpendicular to the central axis above the level of said table means for guiding work past said cutter, said fence assembly including a fence, a shroud at least in part surrounding said motor enclosure, and means for adjustably mounting said fence relative to said shroud thereby to permit angling of the fence about a generally horizontal axis substantially perpendicular to said central axis relative to said table between a vertical position and an angled position with respect to said table thereby to permit the work to be cut by said cutter on a bevel.

7. A direct drive power tool as set forth in claim 6 wherein said shroud is movable in a horizontal direction relative to said stator mount in a direction generally parallel to said central axis.

8. A direct drive tool as set forth in claim 7 further including means for selectively locking said fence in either its perpendicular position or at any desired angled position relative to said table within a limited range.

9. A direct drive tool as set forth in claim 7 further comprising means for selectively locking said shroud at any desired position relative to said stator mount.

10. A direct drive power tool as set forth in claim 2 wherein said bearings are each anti-friction bearings having an outer race and an inner race, said outer race being so sized relative to said pillows as to have a press fit therewithin, and wherein said inner race has a bore for receiving said rotor shaft, the latter including means for positively preventing substantial axial movement of said rotor shaft with respect to said bearings.

11. A direct drive power tool as set forth in claim 10 further comprising a removable fastener for positively securing the outer race of the bearing adjacent said rotor body in fixed position relative to said base.

12. A rotary machine tool, such as a jointer/planer or the like, comprising a base, a table supported on said base, a rotary tool positioned relative to said table so as to shape a workpiece as the latter is moved on said table relative to said rotary tool, and a motor for driving said tool, said motor including a stator having a core with a bore extending longitudinally therethrough, a rotor centered within said bore and being rotatable about a central axis, said rotor having a shaft extending endwise from at least one end of said rotor, said shaft being coaxial with said central axis, said shaft having said rotary tool mounted thereon, said tool further comprising a pair of bearings spaced from one another on opposite sides of said tool for journaling said shaft relative to said base thereby to rotatably mount said tool relative to said base and to rotatably mount and to cantilever said rotor within said bore of said stator core.

13. A combination power tool assembly including a support stand, a first power tool mounted on said stand having a respective dedicated electric motor for driving said first power tool, a second power tool mounted on said stand having a respective dedicated electric motor for driving said second power tool, each of said motors having a respective power cord, and a selector switch having a power supply cord connected thereto which is adapted to be plugged into a source of electrical power, each of said motor power cords being connected to said selector switch, the latter having switch means selectively movable from an off positon in which both of said motors are de-energized to a first operable position in which said first power tool motor is energized and in which said second power tool motor is de-energized or to a second operable position in which said second power tool motor is energized and in which said first power tool motor is de-energized, and means cooperable with said switch means which when in a first position enables said switch means to be selectively moved from its off to its first operable position, and which when in a second position in said selector switch enables said switch means to be moved from its off to its second operable position.

14. A combination power tool assembly including a support stand, a first power tool mounted on said stand having a respective dedicated electric motor for driving said first power tool, a second power tool mounted on said stand having a respective dedicated electric motor for driving said second power tool, each of said motors having a respective power cord, and a selector switch having a power supply cord connected thereto which is adapted to be plugged into a source of electrical power, each of said motor power cords being connected to said selector switch, the latter having switch means selectively movable from an off positon in which both of said motors are de-energized to a first operable position in which said first power tool motor is energized and in which said second power tool motor is de-energized or to a second operable position in which said second power tool motor is energized and in which said first power tool motor is de-energized, and key means cooperable with said switch means which when installed in said selector switch in a first position enables said switch means to be selectively moved from its off to its first operable position, which when installed in a second position in said selector switch enables said switch means to be moved from its off to its second operable position, and which removed from said selector switch prevents energization of either of said power tool motors.

15. A combination power tool assembly as set forth in claim 14 wherein said key has indicia thereon so as to indicate which tool may be energized when said key is either in its first or second operable position.

16. A combination power tool assembly as set forth in claim 14 wherein one of said power tool motor power cords is provided with a male electrical plug and wherein said switch includes a female receptacle for reception of said male plug thereby to permit said one power cord to be readily connected to said switch.

17. In a power tool, such as a table saw or the like, having a dedicated electric motor for driving said power tool, a power cord for said dedicated motor, and a support stand comprising a plurality of legs and a base frame secured to said legs, said base frame comprising a pair of opposed end members, one at each end of said base frame, and a pair spaced apart side members, one at each side of said base frame, said power tool being secured to said base frame and being supported by said legs at a convenient working height, wherein the improvement comprises: a retrofit kit for adapting said power tool and support stand from a single power tool to a dual power tool, said kit comprising a pair of retrofit side members for said base frame longer than said base member side members provided for said single tool support thereby to increase the size of said base frame, a second power tool mounted on said base frame proximate the first mentioned power tool, said second power tool having a respective dedicated electric motor for driving said second power tool, said motors for said first and second power tools each having a respective power cord, and switch means having a power supply cord adapted to be plugged into a source of electrical power, each of said motor power cords being connected to said switch, said switch having switch means selectively movable from an off position in which both of said motors are de-energized to a first operable position in which one of said power tool motors is energized and in which the other of said power tool motors is de-energized or to a second operable position in which said other power tool motor is energized and in which said one power tool motor is de-energized, and key means cooperable with said switch means which when installed in said switch means in a first position enables said switch means to be selectively moved from its off to its first operable position, which when installed in a second position enables said switch means to be moved from its off position to its second operable position, and which when removed from the switch means prevents energization of either of said power tool motors.

* * * * *